United States Patent
Kim et al.

(10) Patent No.: US 11,295,008 B2
(45) Date of Patent: Apr. 5, 2022

(54) GRAPHICS PROCESSING UNIT ACCELERATED TRUSTED EXECUTION ENVIRONMENT

(71) Applicant: NEC Laboratories America, Inc., Princeton, NJ (US)

(72) Inventors: Chung Hwan Kim, Pennington, NJ (US); Junghwan Rhee, Princeton, NJ (US); Kangkook Jee, Princeton, NJ (US); Zhichun Li, Santa Clara, CA (US); Adil Ahmad, Lafayette, IN (US); Haifeng Chen, West Windsor, NJ (US)

(73) Assignee: NEC Corporation

( * ) Notice: Subject to any disclaimer, the term of this patent is extended or adjusted under 35 U.S.C. 154(b) by 249 days.

(21) Appl. No.: 16/787,610

(22) Filed: Feb. 11, 2020

(65) Prior Publication Data
US 2020/0257794 A1     Aug. 13, 2020

Related U.S. Application Data

(60) Provisional application No. 62/804,888, filed on Feb. 13, 2019.

(51) Int. Cl.
*G06F 21/53*     (2013.01)
*G06F 21/60*     (2013.01)
(Continued)

(52) U.S. Cl.
CPC .......... *G06F 21/53* (2013.01); *G06F 9/45558* (2013.01); *G06F 21/12* (2013.01);
(Continued)

(58) Field of Classification Search
CPC ........ G06F 21/12; G06F 21/44; G06F 21/445; G06F 21/53; G06F 21/54; G06F 21/57;
(Continued)

(56) References Cited

U.S. PATENT DOCUMENTS

| | | | |
|---|---|---|---|
| 2016/0080320 A1* | 3/2016 | Barakat | H04L 63/20 726/4 |
| 2017/0161204 A1* | 6/2017 | Roberts | G06T 1/20 |

(Continued)

OTHER PUBLICATIONS

Volos et al., "Graviton: Trusted Execution Environments on GPUs", Proceedings of the 13th USENIX Symposium on Operating Systems Design and Implementation (OSDI'18), Oct. 2018, pp. 1-16.

*Primary Examiner* — Minh Dinh
(74) *Attorney, Agent, or Firm* — Joseph Kolodka (57) ABSTRACT

Systems and methods for implementing a system architecture to support a trusted execution environment (TEE) with computational acceleration are provided. The method includes establishing a first trusted channel between a user application stored on an enclave and a graphics processing unit (GPU) driver loaded on a hypervisor. Establishing the first trusted channel includes leveraging page permissions in an extended page table (EPT) to isolate the first trusted channel between the enclave and the GPU driver in a physical memory of an operating system (OS). The method further includes establishing a second trusted channel between the GPU driver and a GPU device. The method also includes launching a unified TEE that includes the enclave and the hypervisor with execution of application code of the user application.

20 Claims, 9 Drawing Sheets

(51) Int. Cl.
    *G06F 21/12*          (2013.01)
    *G06F 9/455*          (2018.01)
    *G06F 21/54*          (2013.01)
    *G06F 21/44*          (2013.01)

(52) U.S. Cl.
    CPC .............. *G06F 21/44* (2013.01); *G06F 21/54* (2013.01); *G06F 21/606* (2013.01); *G06F 2009/45587* (2013.01); *G06F 2221/033* (2013.01); *G06F 2221/0735* (2013.01); *G06F 2221/2149* (2013.01)

(58) Field of Classification Search
    CPC ...... G06F 21/575; G06F 21/606; G06F 21/74; G06F 21/82; G06F 21/85; G06F 2221/033; G06F 2221/0735; G06F 2221/2149; G06F 9/45558; G06F 2209/45587
    See application file for complete search history.

(56) References Cited

U.S. PATENT DOCUMENTS

| | | | |
|---|---|---|---|
| 2019/0220601 A1* | 7/2019 | Sood | G06F 21/57 |
| 2020/0004993 A1* | 1/2020 | Volos | G06F 21/805 |
| 2021/0176063 A1* | 6/2021 | Liu | G06F 21/575 |

\* cited by examiner

GRAPHICS PROCESSING UNIT ACCELERATED TRUSTED EXECUTION ENVIRONMENT

RELATED APPLICATION INFORMATION

This application claims priority to U.S. Provisional Patent Application No. 62/804,888, filed on Feb. 13, 2019, incorporated herein by reference herein its entirety.

BACKGROUND

Technical Field

The present invention relates to trusted execution environments and more particularly computational acceleration.

Description of the Related Art

Cloud computing is a shared computing environment. The confidentiality of sensitive code and data is an issue for cloud users and cloud providers. To address the confidentiality problem, hardware manufacturers have implemented schemes on trusted hardware in central processing units (CPUs). These hardware schemes provide a trusted execution environment (TEE) with strong confidentiality and integrity protection, where sensitive code and data can be loaded and executed in isolation from untrusted software.

SUMMARY

According to an aspect of the present invention, a method is provided for implementing a system architecture to support a trusted execution environment (TEE) with computational acceleration. The method includes establishing a first trusted channel between a user application stored on an enclave and a graphics processing unit (GPU) driver loaded on a hypervisor. Establishing the first trusted channel includes leveraging page permissions in an extended page table (EPT) to isolate the first trusted channel between the enclave and the GPU driver in a physical memory of an operating system (OS). The method further includes establishing a second trusted channel between the GPU driver and a GPU device. The method also includes launching a unified TEE that includes the enclave and the hypervisor with execution of application code of the user application.

According to another aspect of the present invention, a system is provided for implementing a system architecture to support a trusted execution environment (TEE) with computational acceleration. The system includes a processor device operatively coupled to a memory device, the processor device being configured to establish a first trusted channel between a user application stored on an enclave and a graphics processing unit (GPU) driver loaded on a hypervisor. Establishing the first trusted channel includes leveraging page permissions in an extended page table (EPT) to isolate the first trusted channel between the enclave and the GPU driver in a physical memory of an operating system (OS). The processor device establishes a second trusted channel between the GPU driver and a GPU device. The processor device also launches a unified TEE that includes the enclave and the hypervisor with execution of application code of the user application.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided for implementing a system architecture to support a trusted execution environment (TEE) with computational acceleration (without implementing changes to the hardware design of central processing units (CPUs) and accelerators). In order to create a unified TEE, the system architecture proceeds through multiple stages to load the user application and GPU driver into a secure enclave and a hypervisor, respectively. The system also establishes trusted channels between the GPU driver and the enclave and between the GPU driver and GPU device in order to prevent an attacker from leaking sensitive code and data from the hardware channels in the memory and bus.

The systems and methods enable a unified TEE that protects sensitive code and data in all surfaces (for example, interfaces) between the user application and accelerators. A unified TEE extends the protection scope of an original TEE from "enclave only" to enclave plus enclave-GPU communication. This sensitive code is the code that will be executed inside the GPU. The application contains the GPU code but does not execute it. The application sends the GPU code (and data) to the GPU with the help of a general-purpose GPU library (e.g., a parallel computing platform and programming model for general computing on graphical processing units, such as NVIDIA™_CUDA™, etc.) and a GPU driver before the GPU computation. In the software stack, the protected surfaces include the execution of the application and run-time in the user space as well as the GPU driver in the kernel space. In the hardware spaces, the architecture protects the memory and bus where sensitive code and data reside and are transmitted, respectively.

In one embodiment, the system leverages hardware support for TEEs and virtualization to realize (for example, implement) the unified TEEs. In particular, the system uses a hardware-assisted virtualization scheme to implement the TEEs with acceleration with GPUs. For example, the system can execute the device driver in a tiny (for example, lightweight, relatively small resource using, restricted, etc.), dynamically loadable hypervisor. Inside the TEE, the user-space code and data are executed in an enclave while the device driver is executed in the hypervisor in isolation from other untrusted programs.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
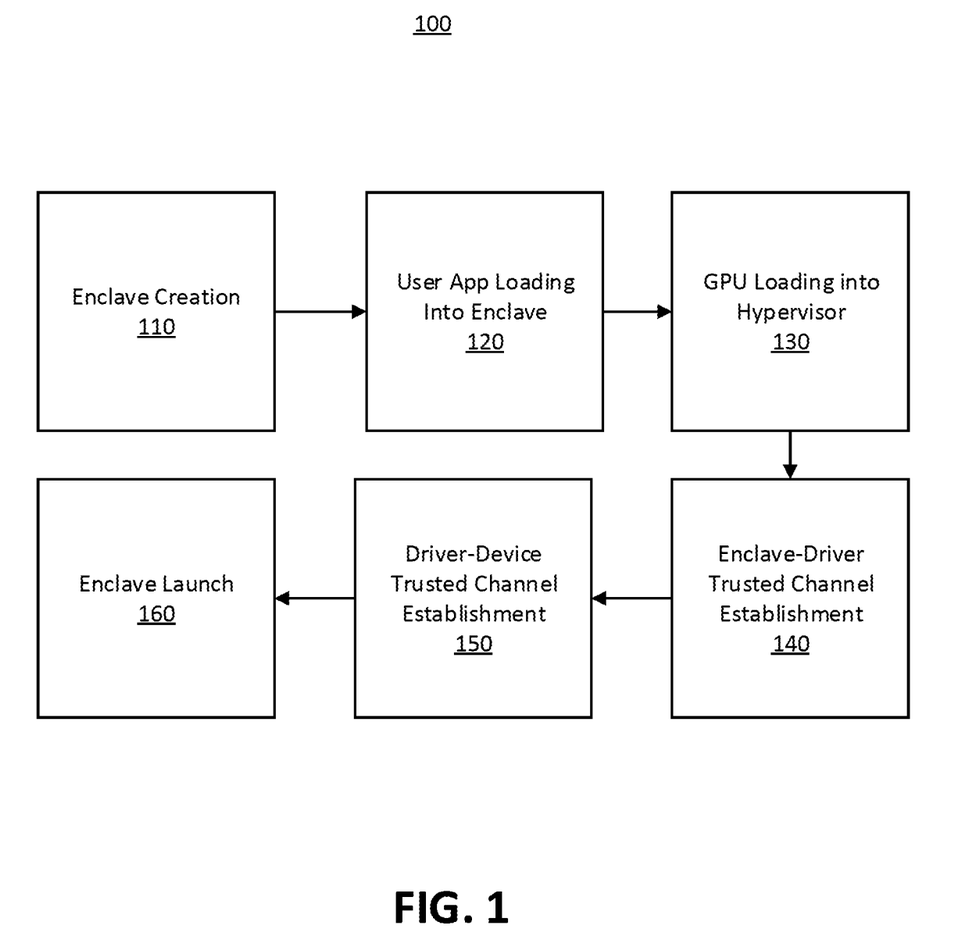
FIG. 1 is a block diagram illustrating a high-level system for implementing graphics processing unit (GPU) acceleration for secure enclaves, in accordance with an embodiment of the present invention.

Referring now in detail to the figures in which like numerals represent the same or similar elements and initially to FIG. 1, a high-level system for implementing graphics processing unit (GPU) acceleration for secure enclaves is illustratively depicted in accordance with one embodiment of the present invention.

As shown in FIG. 1, system 100 includes components that implement a workflow for trusted GPU acceleration for secure enclaves. The system 100 includes components for enclave creation 110, user application loading into enclave 120, GPU loading into hypervisor 130, enclave-driver trusted channel establishment 140, driver-device trusted channel establishment 150 and enclave launch 160. An enclave is a section of the computing system that is subdivided from the rest of the computing system. The hypervisor (for example, a virtual machine monitor (VMM)) can include computer software, firmware or hardware that creates and runs virtual machines by sharing resources of the computing system, such as memory, and processing.

System 100 includes components for implementing enclave creation 110, user application (app) loading into enclave 120, GPU loading into hypervisor 130, enclave-driver trusted channel establishment 140, driver-device trusted channel establishment 150 and enclave launch 160.

In order to create a unified TEE, the system architecture implements the components (or alternatively, multiple stages) to load the user application (user application (app) loading into enclave 120) and GPU driver into a secure enclave and a hypervisor (GPU loading into hypervisor 130), respectively. The TEE refers to an environment that supports one or more enclaves. The example embodiments provide TEEs that support GPU acceleration inside an enclave. In contrast, hardware schemes provide a TEE that does not originally support GPU acceleration inside an enclave for the following reasons. First, a TEE provided by hardware schemes is designed to protect computation inside the CPU only and thus GPUs are outside the scope of a TEE. Second, a GPU is a peripheral device (mostly implemented as a Peripheral Component Interconnect Express (PCIe) card) and relies on the CPU to (1) send the required code and data and (2) receive the result data before and after the computation, respectively. The example embodiments provide TEEs that protect code or data that leave the enclave boundaries and are transmitted to or from a peripheral device. The example embodiments provide secure computational acceleration for enclaves by protecting these GPU code and data from untrusted programs. The example embodiments extend the scope of a TEE to protect the GPU driver that works as a middleman between the user application inside the enclave and the GPU hardware. The GPU driver is executed in a hypervisor, thereby the GPU driver can be isolated from a compromised operating system. Between the enclave and the GPU driver, the transmitted code and data are protected by encryption (for example, based on enclave-driver trusted channel establishment 140, and driver-device trusted channel establishment 150). Between the GPU driver and GPU hardware, the hardware spaces used to transmit the code and data are monitored by the hypervisor. The hypervisor ensures that only the GPU driver in the hypervisor can access the hardware spaces. Any other accesses are disallowed and cause the hypervisor to generate a page fault.

An enclave is private region of memory that loads the sensitive code and data to protect. The CPU guarantees that the protected code and data can only be accessed by the code inside the enclave. Any code outside the enclave cannot access these code and data when executed. A hypervisor is a program that runs on the bare-metal computer directly and manages one or more operating systems. Because the CPU runs the hypervisor in a higher privilege mode than an operating system, it is safe from a compromised operating system. The technology that enables this is called virtualization. The secure enclave can protect data through a secure computing infrastructure that provides integrated security. The hypervisor provides the guest operating systems with a virtual operating platform and manages the execution of the guest operating systems. Multiple instances of a variety of operating systems can share the virtualized hardware resources. The system 100 can also establish trusted channels between the GPU driver and the enclave (for example, based on enclave-driver trusted channel establishment 140) and between the GPU driver and GPU device (for example, based on driver-device trusted channel establishment 150) in order to prevent an attacker from leaking sensitive code and data from the hardware channels in the memory and bus.

In one embodiment, the system architecture provides support for TEEs with computational acceleration without implementing any complementary changes in hardware design of CPUs and accelerators. The system 100 enables a unified TEE that protects the sensitive code and data in all surfaces between the user application and accelerators. In the software stack (for example, a group of programs that work in tandem to achieve a common goal), the protected surfaces include the execution of the application and run-time in the user space as well as the accelerator driver in the kernel space. In the hardware spaces (for example, within the physical design of the computing system), the architecture protects the memory and bus where sensitive code and data reside and are transmitted, respectively.

According to example embodiments, the system 100 leverages hardware support for TEEs and virtualization to realize the unified TEEs. For example, the system can use (1) security related instruction codes (such as INTEL™ SGX™, etc.) to run a user application inside an enclave and (2) virtualization schemes (such as INTEL™ VMX™, etc.) to run the hypervisor and the GPU driver in it. The unified TEE combines security related instruction codes and virtualization schemes, and protects the communication between security related instruction codes and virtualization schemes through encryption. Moreover, the system ensures that only the GPU driver in the hypervisor can access the GPU hardware. In particular, the system 100 uses a hardware-assisted virtualization scheme, to execute the device driver in a tiny, dynamically loadable hypervisor. The system 100 can thereby implement acceleration with GPUs. Inside the TEE, the user-space code and data are executed in an enclave (after enclave launch 160) while the device driver is executed in the hypervisor in isolation from other untrusted programs. The system 100 implements a process to address hardware schemes that are independent and not designed to collaborate to provide a unified TEE, to make the hardware schemes work securely in the system architecture. In addition, the system 100 can avoid the use of (for example, not use) cryptographic operations to secure the channels between the CPUs and accelerators (for example, efficiently). With data encryption, accelerators with high input output (IO) bandwidth (for example, GPUs and TPUs) can result in unacceptably large overheads. The design of device 100 with memory and bus isolation ensures that the program entities within the TEE can communicate efficiently with high scalability through trusted paths while keeping the transferred code and data confidential.

Figure 2:
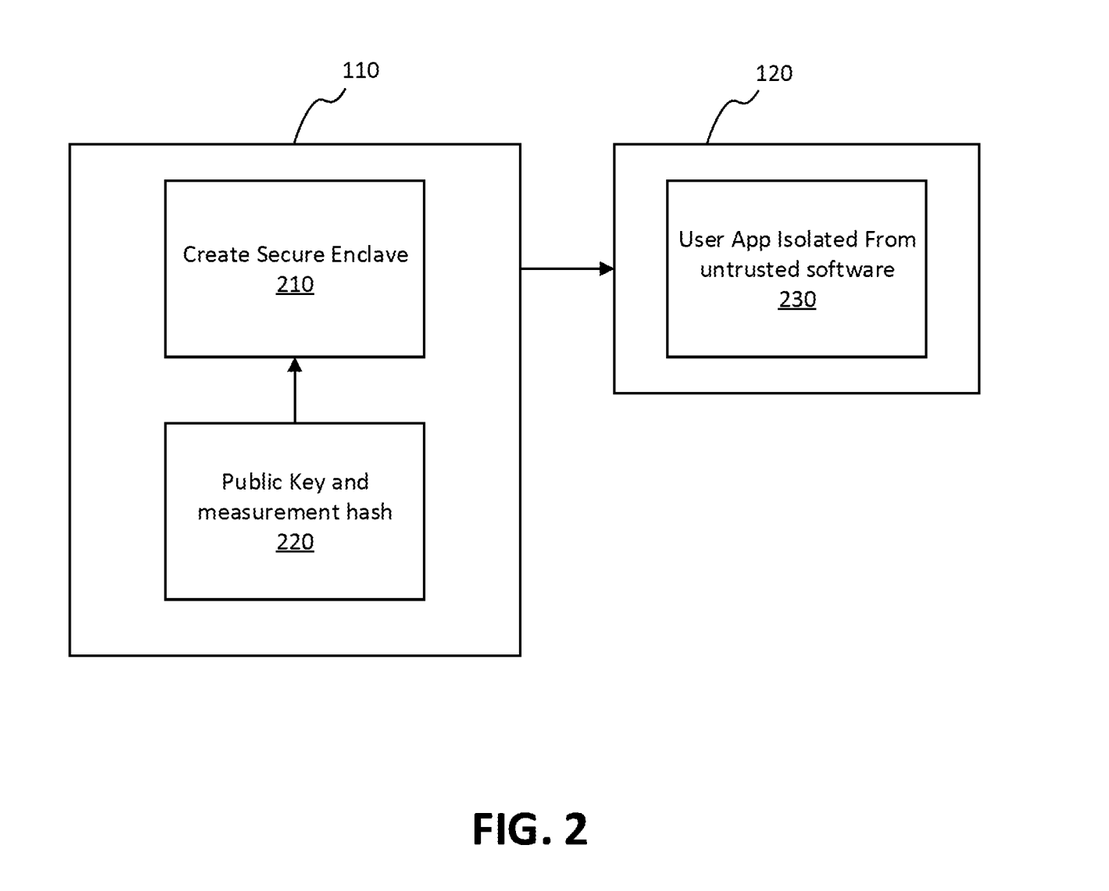
FIG. 2 is a block diagram illustrating a component for implementing enclave creation and user application loading, in accordance with an embodiment of the present invention.

Referring now to FIG. 2, a block diagram of components (or sub-processes) for implementing enclave creation 110 and user application loading 120 is illustratively depicted in accordance with one embodiment of the present invention.

As shown in FIG. 2, when a user application with GPU acceleration needs to be loaded and executed, the unified TEE first creates a secure enclave 210 (for example, by using an instruction that instantiates a new enclave, using the public key and measurement hash 220 given by the user). For example, without the valid public key and measurement hash, security related instruction codes can ensure that the initialization of the enclave fails later when an instruction to initialize an enclave for execution is executed. The sensitive code and data of the user application and run-time 120 can be added as protected pages into the enclave using an instruction to add a page to an uninitialized enclave. The enclave then executes the code that loads the GPU driver when an instruction to transfer execution to an enclave (for example, enter an enclave) is executed followed by the instruction to initialize the enclave for execution. Once loaded, the user application and run-time can be isolated (for example, are in strong isolation) from (for example, other) untrusted software 230. For example, secure enclaves can be implemented to protect sensitive application code and data from any untrusted programs running on the CPU. Untrusted programs can include application code outside the enclaves, as well as privileged system software, such as operating system (OS), hypervisor, and basic input output system (BIOS), which may be compromised by an attacker.

Figure 3:
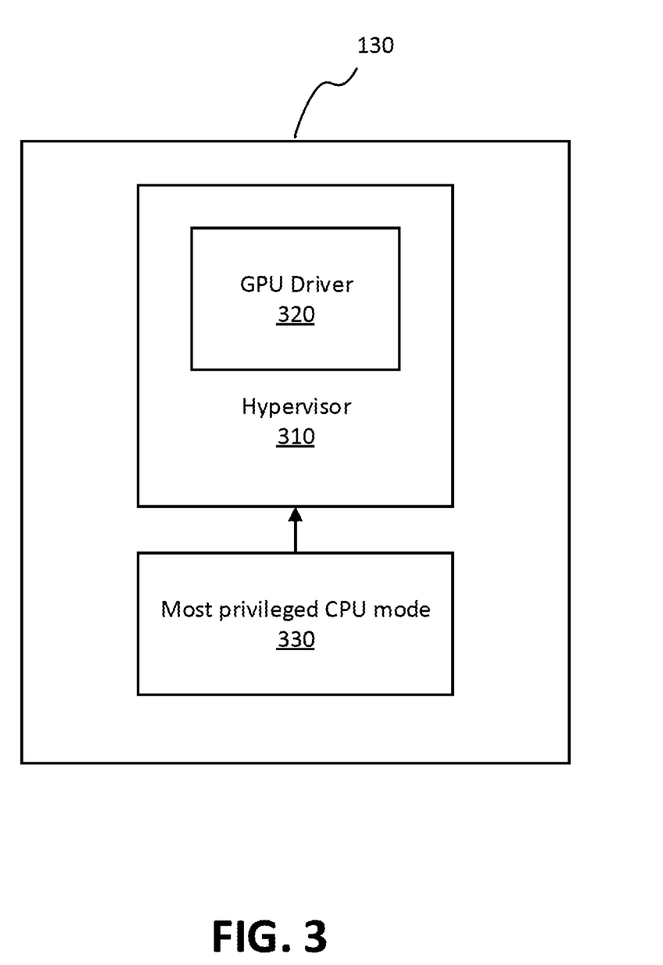
FIG. 3 is a block diagram illustrating a component for implementing GPU driver loading into hypervisor, in accordance with an embodiment of the present invention.

Referring now to FIG. 3, a block diagram of a component (or sub-process) for implementing GPU driver loading into hypervisor 130 is illustratively depicted in accordance with one embodiment of the present invention.

As shown in FIG. 3, the enclave dynamically launches a (for example, tiny, limited resource using, etc.) hypervisor 310, dedicated to only run the GPU driver 320. Running from the most privileged CPU mode 330, the hypervisor 310 isolates the GPU driver 320 from other software that runs in less privileged modes (including the user and kernel modes). This ensures that the confidentiality of the driver execution is protected against attackers who have control over untrusted applications (and/or the operating system (OS)). The size of the trusted computing base and run-time overhead of this hypervisor 310 can be minimal as the hypervisor 310 (for example, only, is limited to, etc.) implements the small functionality essential to run the GPU driver 320, unlike a full-fledged hypervisor that manages multiple virtual machines.

Figure 4:
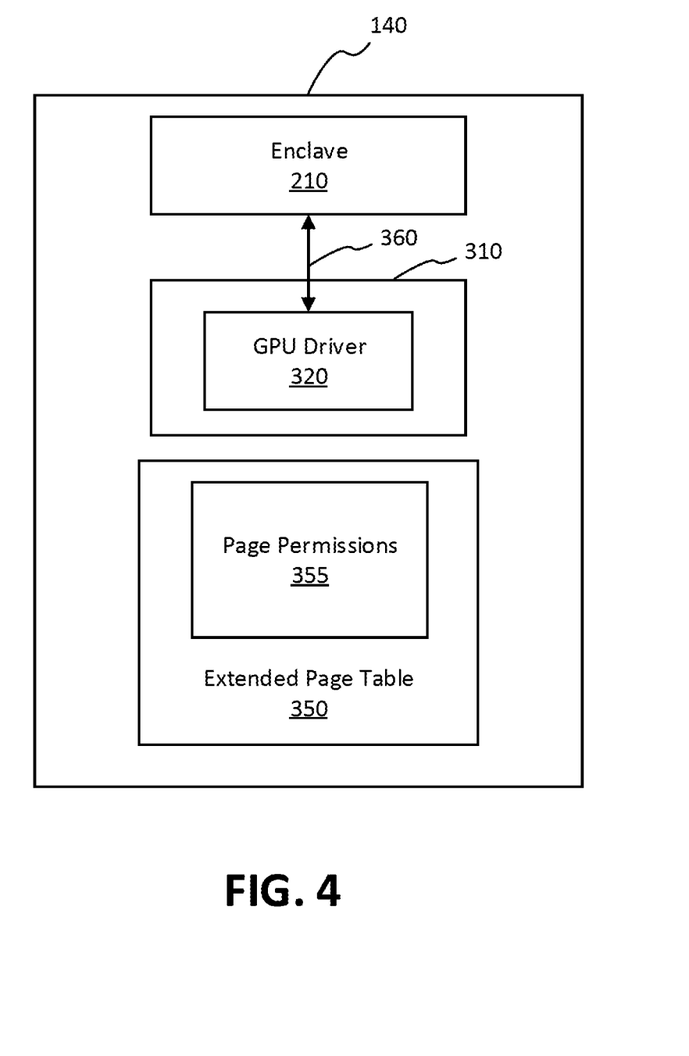
FIG. 4 is a block diagram illustrating a component for implementing, in accordance with an embodiment of the present invention.

FIG. 4 is a block diagram of a component (or sub-process) for implementing trusted channel establishment between enclave and GPU driver 140 illustratively depicted in accordance with one embodiment of the present invention.

The system 100 can leverage page permissions 355 in an extended page table (EPT) 350 provided, for example, by a hardware-assisted virtualization scheme, to isolate the channel 360 between the enclave 210 and the GPU driver 320 in the physical memory of the OS. A GPU driver 320 and the corresponding user run-time transfers sensitive code and data through shared memory in order to offload the workloads to the GPU device (not shown in FIG. 4). The hypervisor 310 marks the pages that contain the code and data as only accessible by the GPU driver 320 and enclave 210 in the EPT 350 whenever the transmission happens through the memory. In instances in which untrusted software attempts to access the memory, the CPU then raises a trap (for example, an exception or a fault that can include a synchronous interrupt) to the hypervisor 310 and thereby the attempted access by the untrusted software is detected as illegal access. Once the transmission is completed, the hypervisor 310 can ensure that the corresponding pages are unmarked for other usages later. The system 100 can zero out the contents of the pages to not leave any sensitive information behind.

Figure 5:
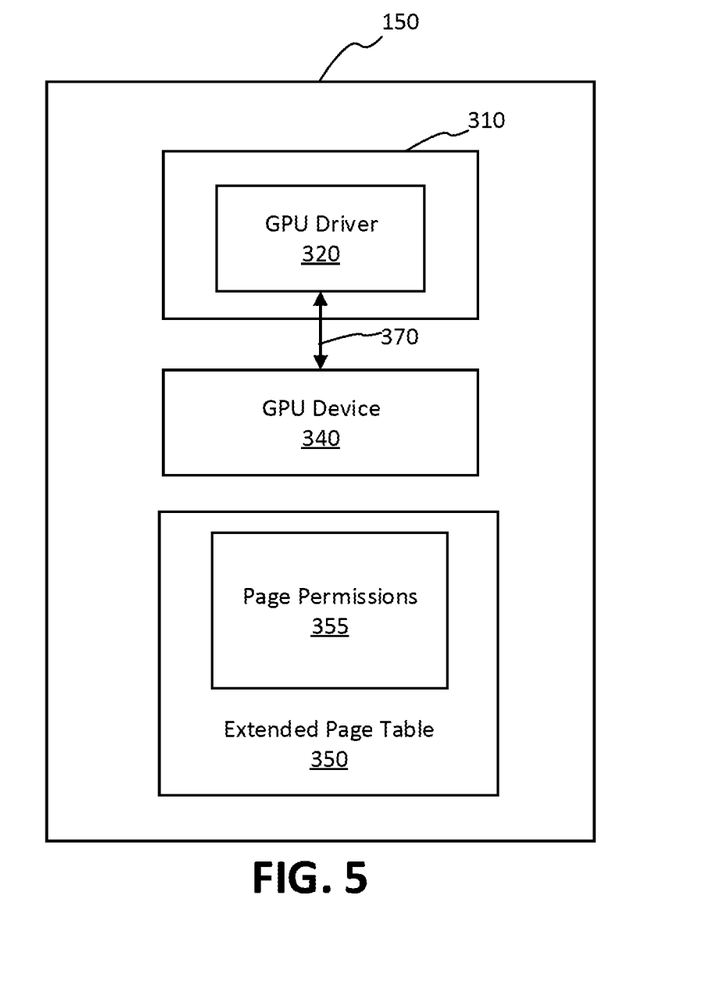
FIG. 5 is a block diagram illustrating a component for implementing, in accordance with an embodiment of the present invention.

FIG. 5 is a block diagram of a component (or sub-process) for implementing trusted channel establishment between GPU driver and device 150 illustratively depicted in accordance with one embodiment of the present invention.

The GPU driver 320 in the hypervisor 310 is implemented to manage and control the GPU device 340 to support the acceleration. A GPU driver 320 and GPU device 340 can interact through multiple hardware spaces, such as IO port, physical memory, and interrupt spaces. Through the authentication of the GPU driver 320 at every access to each of these spaces (for example, for device configuration and code/data transmission), the hypervisor 310 ensures that only the trusted GPU driver 320 has exclusive access to the GPU device 340 while the GPU driver 320 is loaded and executed. Access to these spaces from any other software will either trap to the hypervisor 310 (physical memory space) or is prevented through authentication (IO port and interrupt spaces).

A trusted channel 370 is established between the GPU driver 320 and the GPU device 340. For the physical memory space, the hypervisor 310 leverages the EPT 350 to mark the pages shared between the GPU driver 320 and GPU device 340 in the physical memory, for example, in a similar manner to the trusted channel establishment between the enclave 210 and GPU driver 320, as described herein above with respect to FIG. 4. For example, the system 100 can use Diffie-Hellman key exchange, and encrypt and decrypt the code and data between the enclave and GPU driver using the keys.

Figure 6:
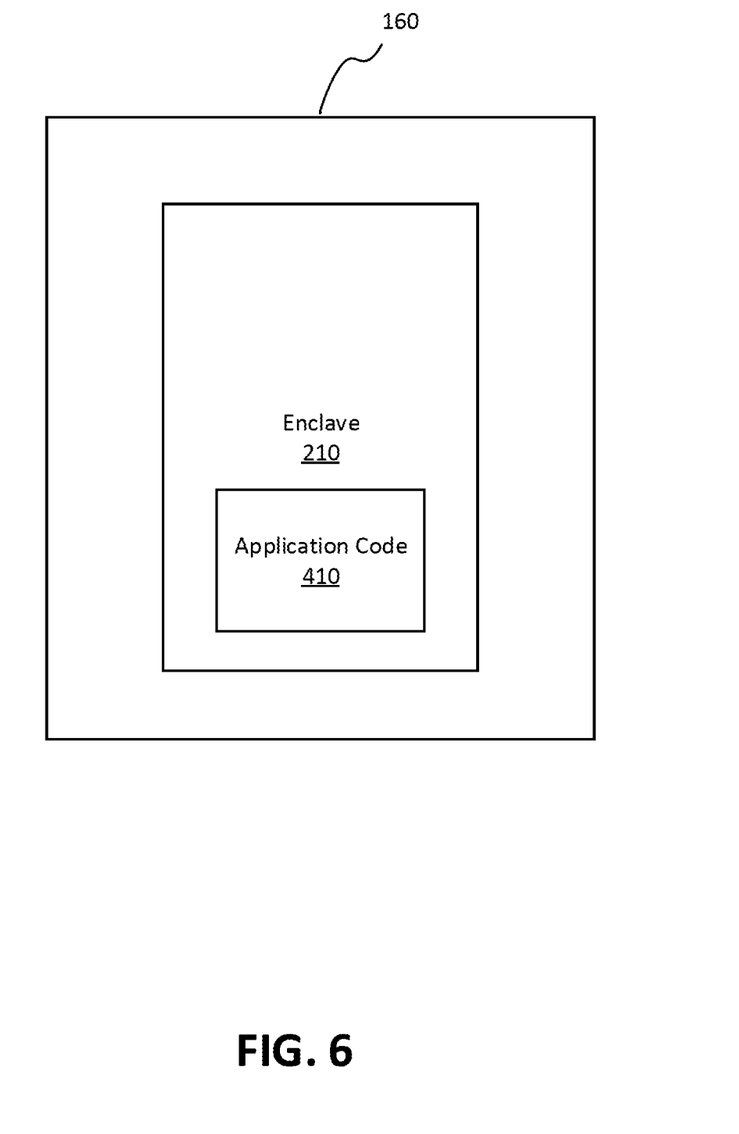
FIG. 6 is a block diagram illustrating a component for implementing, in accordance with an embodiment of the present invention.

Referring now to FIG. 6, a block diagram of a component (or sub-process) for implementing enclave launch 160 is illustratively depicted in accordance with one embodiment of the present invention.

After the initialization of the enclave 210, secure application and driver loading, and trusted channel establishments, the enclave begins to execute the application code 410. During the execution, the unified TEE (for example, via enclave 210) protects the confidentiality of the sensitive (application) code 410 and data execution in the entire software stack and hardware spaces that an attacker may attempt to target. The user application can safely accelerate the computation using the GPU device 340 (not shown in FIG. 6) through the trusted channels protected by the TEE.

Figure 7:
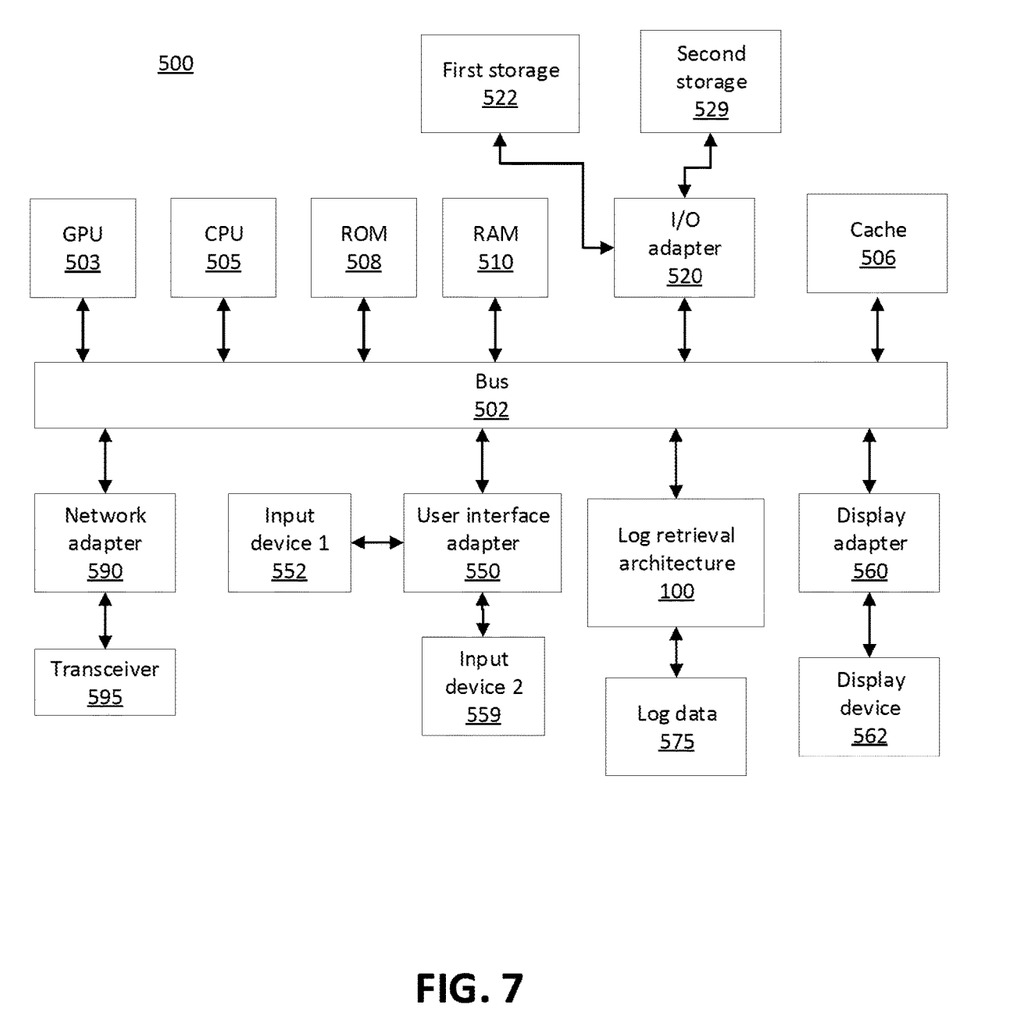
FIG. 7 is a schematic and block diagram illustrating a high-level system for implementing a system architecture to support a trusted execution environment (TEE) with computational acceleration, in accordance with an embodiment of the present invention.

Referring now to FIG. 7, an exemplary computer system (e.g., a server or a network device) for implementing a system architecture to support a TEE with computational acceleration is shown in accordance with an embodiment of the present invention. The computer system 500 includes at least one graphic processing unit (GPU) 503 and processing device (CPU) 505 operatively coupled to other components via a system bus 502. A cache 506, a Read Only Memory (ROM) 508, a Random-Access Memory (RAM) 510, an input/output (I/O) adapter 520, a network adapter 590, a user interface adapter 550, a log retrieval architecture 100 and a display adapter 560, can be operatively coupled to the system bus 502.

A first storage device 522 and a second storage device 529 can be operatively coupled to system bus 502 by the I/O adapter 520. The storage devices 522 and 529 can be any of a disk storage device (e.g., a magnetic or optical disk storage device), a solid state magnetic device, and so forth. The storage devices 522 and 529 can be the same type of storage device or different types of storage devices. Either or both of the storage devices 522 and 529 can be configured to operate as a data store or database to store various logs of system events (e.g., heterogeneous logs). Log retrieval architecture 100 can include software and/or hardware as described herein.

A transceiver 595 can be operatively coupled to system bus 502 by network adapter 590. A display device 562 is operatively coupled to system bus 502 by display adapter 560. Log data 575 can be operatively coupled to system bus 502 directly or indirectly, for example via log retrieval architecture 100. Log retrieval architecture 100 can be configured for system anomaly detection by retrieving a set of most similar logs from a historical database based on a set of query logs (e.g., via log data 575).

A first user input device 552 and a second user input device 559 can be operatively coupled to system bus 502 by user interface adapter 550. The user input devices 552 and 559 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used in accordance with the present invention. The user input devices 552 and 559 can be the same type of user input device or different types of user input devices. The user input devices 552 and 559 can be used to input and output information to and from system 500.

Other embodiments of the present invention can optionally include a mother board, or alternatively/additionally another storage medium, an operating system, one or more application software, as well as including one or more communication interfaces (e.g., RS232, Ethernet, Wi-Fi, Bluetooth, USB). Useful examples of computing devices optionally included in or integrable with embodiments of the present invention include, but are not limited to, personal computers, smart phones, laptops, mobile computing devices, tablet PCs, and servers. In accordance with embodiments of the present invention, an event record log source can be a computer storage medium.

Of course, the computer system 500 can also include other elements (not shown), as readily contemplated by one of skill in the art, as well as omit certain elements. For example, various other input devices and/or output devices can be included in computer system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 500 are readily contemplated by one of ordinary skill in the art given the teachings of the present invention provided herein.

It should be understood that multiple computing devices can be operably linked to form a computer network in a manner as to distribute and share one or more resources, such as clustered computing devices and server banks/farms. In embodiments of the present invention each of the aforementioned elements (e.g., device, medium, source, or module) can be directly or indirectly communicably connected (e.g., via a wireless a wired electronic connection) to at least one other element of the system. As described in more detail below, some embodiments of the present invention can be wholly contained within a single computing device. Other embodiments, however, can encompass a plurality of interconnected or networked devices and resources.

The system 500 implements a system architecture to support a TEE with computational acceleration (without implementing changes to the hardware design of central processing units (CPUs) and accelerators). The system 500 enables a unified TEE that protects sensitive code and data in all surfaces (for example, interfaces) between the user application and accelerators.

Figure 8:
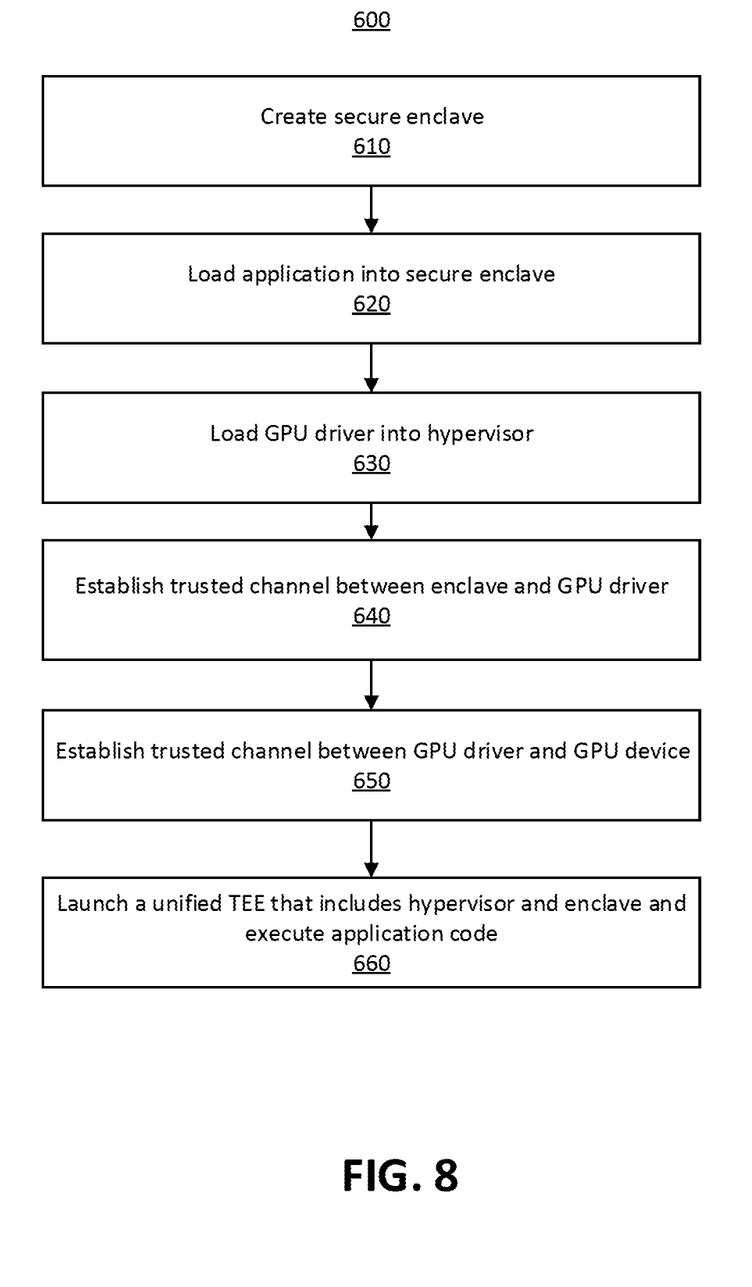
FIG. 8 is a flow diagram illustrating a method for implementing a system architecture to support a TEE with computational acceleration, in accordance with an embodiment of the present invention.

Referring now to FIG. 8, a method 600 for implementing a system architecture to support a TEE with computational acceleration illustratively depicted in accordance with an embodiment of the present invention.

At block 610, system 100 creates an enclave 210. For example, system 100 creates a secure enclave 210 using the public key and measurement hash 220 given by the user.

At block 620, system 100 loads the user application loading into the secure enclave. Without the valid public key and measurement hash, the system 100 can ensure that the initialization of the enclave fails later when an initialization instruction is executed. System 100 can execute code that loads the GPU driver 320.

At block 630, system 100 loads the GPU driver 320 into hypervisor 310. For example, the enclave 210 can dynamically launch a hypervisor 310 that is dedicated to only run the GPU driver 320. Running from the most privileged CPU mode, the hypervisor 310 isolates the GPU driver 320 from other software that runs in less privileged modes (including the user and kernel modes).

At block 640, system 100 establishes a trusted channel between the enclave 210 and GPU driver 320. For example, system 100 can leverage page permissions in an extended page table (EPT) to isolate the channel between the enclave 210 and the GPU driver 320 in the physical memory of the OS. For example, a virtualization technology (e.g., Intel VMX) can provide an EPT that the hypervisor manages for operating systems. This page table is different from the page tables that an operating system manages and hidden from the operating systems. In example embodiments, the hypervisor (1) identifies which pages are used by the GPU driver and GPU hardware to transmit code and data, and (2) protects the pages by setting the "non-accessible" permission on the identified pages.

At block 650, system 100 establishes a trusted channel between GPU driver 320 and GPU device 340. For example, through authentication of the GPU driver 320 at every access by the GPU device 340, the hypervisor 310 ensures that only the trusted GPU driver 320 has exclusive access to the GPU device 340 while the GPU driver 320 is loaded and executed. When the pages of the EPT are accessed by the GPU driver or GPU hardware, the hardware generates a page fault (because it is configured non-accessible) and the hypervisor receives a chance to check whether the page is accessed legitimately (that is, by the trusted GPU driver or hardware).

At block 660, system 100 launches a unified TEE that includes the enclave 210 and the hypervisor 310. The system 100 begins execution of application code of the user application.

Figure 9:
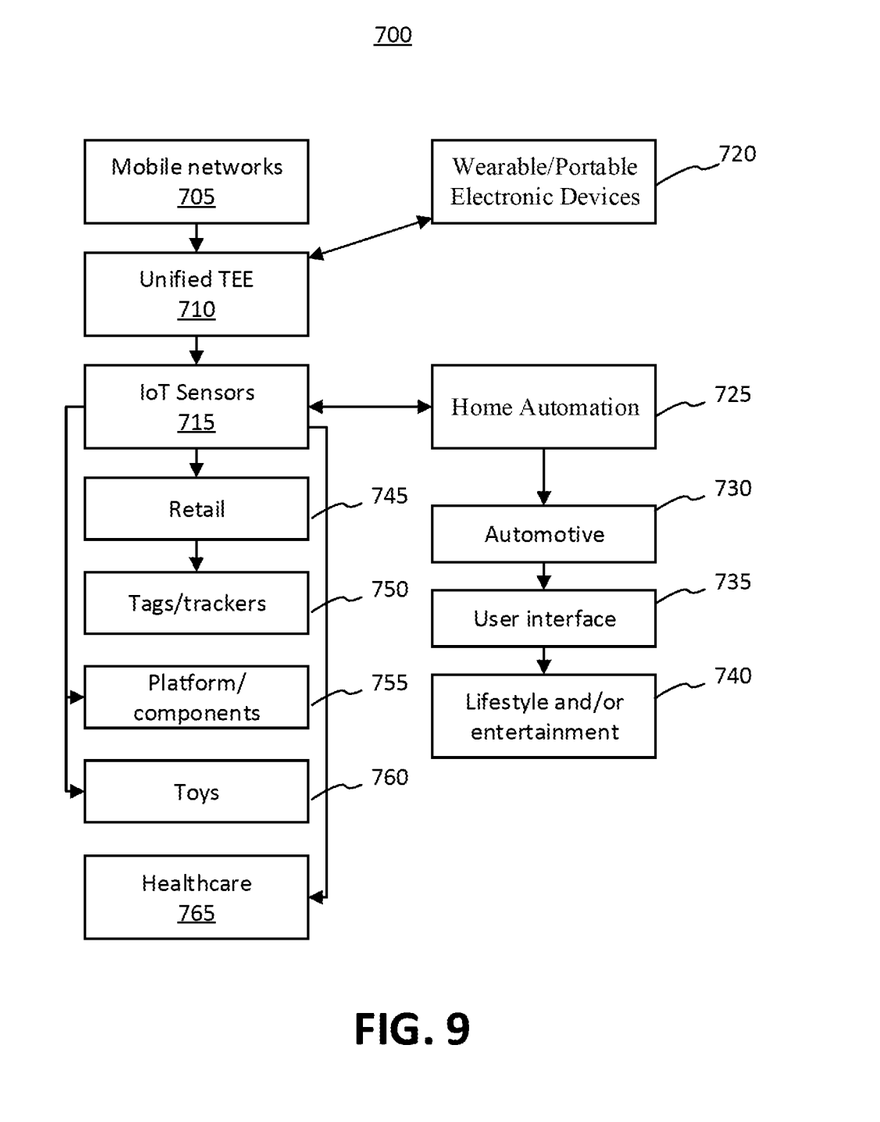
FIG. 9 is a schematic and block diagram illustrating a method for implementing a system architecture to support a TEE with computational acceleration, in accordance with an embodiment of the present invention.

Referring now to FIG. 9, an exemplary method 700 for implementing a unified TEE in Internet of Things (IoT) systems or devices or infrastructure is illustratively depicted in accordance with an embodiment of the present invention.

IoT enables advanced connectivity of computing and embedded devices through internet infrastructure. IoT involves machine-to-machine communications (M2M), where it is important to continuously monitor connected machines to detect any anomaly or bug and resolve them quickly to minimize downtime.

The mobile networks 705 can communicate with, e.g., wearable, implantable, or ingestible electronic devices and Internet of Things (IoT) sensors. The wearable, implantable, or ingestible devices can include at least health and wellness monitoring devices, as well as fitness devices. The wearable, implantable, or ingestible devices can further include at least implantable devices, smart watches, head-mounted devices, security and prevention devices, and gaming and lifestyle devices. The IoT sensors can be incorporated into at least home automation applications, automotive applications, user interface applications, lifestyle and/or entertainment applications, city and/or infrastructure applications, toys, healthcare, fitness, retail tags and/or trackers, platforms and components, etc. The mobile networks 705 described herein can communicate with any type of electronic devices for any type of use or application or operation.

IoT (Internet of Things) is an advanced automation and analytics system which exploits networking, sensing, big data, and artificial intelligence technology to deliver complete systems for a product or service. These systems allow greater transparency, control, and performance when applied to any industry or system.

IoT systems have applications across industries through their unique flexibility and ability to be suitable in any environment. IoT systems enhance data collection, automation, operations, and much more through smart devices and powerful enabling technology.

IoT systems allow users to achieve deeper automation, analysis, and integration within a system. IoT improves the reach of these areas and their accuracy. IoT utilizes existing and emerging technology for sensing, networking, and robotics. Features of IoT include artificial intelligence, connectivity, sensors, active engagement, and small device use. In various embodiments, the mobile networks 705 of the present invention can communicate with a variety of different devices and/or systems. For example, the mobile networks 705 can communicate with wearable or portable electronic devices 720. Wearable/portable electronic devices 720 can include implantable devices, such as smart clothing. Wearable/portable devices 720 can include smart watches, as well as smart jewelry. Wearable/portable devices 720 can further include fitness monitoring devices, health and wellness monitoring devices, head-mounted devices (e.g., smart glasses), security and prevention systems, gaming and lifestyle devices, smart phones/tablets, media players, and/or computers/computing devices.

The mobile networks 705 of the present invention can further communicate with Internet of Thing (IoT) sensors 715 for various applications, such as home automation 725, automotive 730, user interface 735, lifestyle and/or entertainment 740, retail 745, tags and/or trackers 750, platform and components 755, toys 760, and/or healthcare 765, etc. Of course, one skilled in the art can contemplate such mobile networks 705 communicating with any type of electronic devices for any types of applications, not limited to the ones described herein.

The unified TEE 710 can be used in implementation of the IoT systems and mobile networks 705, such as cloud computing as a shared computing environment, and can protect the confidentiality of sensitive code and data for cloud users and cloud providers.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for implementing a system architecture to support a trusted execution environment (TEE) with computational acceleration, comprising:
   establishing a first trusted channel between a user application stored on an enclave and a graphics processing unit (GPU) driver loaded on a hypervisor, wherein establishing the first trusted channel includes leveraging page permissions in an extended page table (EPT) to isolate the first trusted channel between the enclave and the GPU driver in a physical memory of an operating system (OS);
   establishing a second trusted channel between the GPU driver and a GPU device; and
   launching a unified TEE that includes the enclave and the hypervisor with execution of application code of the user application.

2. The method as recited in claim 1, wherein during the execution of the application code, the unified TEE protects the confidentiality of the application code and data execution in the entire software stack and hardware spaces.

3. The method as recited in claim 1, further comprising:
   accelerating computation using the GPU device through the first trusted channel and the second trusted channel, wherein the first trusted channel and the second trusted channel are protected by the unified TEE.

4. The method as recited in claim 1, wherein establishing the second trusted channel further comprises:
   leveraging page permissions in the EPT to mark pages shared between the GPU driver and GPU device in the physical memory.

5. The method as recited in claim 4, wherein the GPU driver and a corresponding user run-time transfers at least one of sensitive code and sensitive data through shared memory to offload workloads to the GPU device.

6. The method as recited in claim 5, further comprising:
   marking, by the hypervisor, pages that contain the at least one of sensitive code and sensitive data as only accessible by the GPU driver and the enclave in the EPT whenever transmission is implemented through the shared memory.

7. The method as recited in claim 5, further comprising:
in response to an attempt by untrusted software to access the shared memory, raising a trap to the hypervisor and detecting the attempt as illegal access.

8. The method as recited in claim 1, wherein establishing the second trusted channel further comprises:
performing authentication of the GPU driver at every access to each hardware space through which the GPU device and GPU driver interact.

9. The method as recited in claim 8, further comprising:
in response to an attempt to access by a software other than the GPU driver, implementing at least one of:
trapping access to the hypervisor; and
preventing the access through authentication.

10. The method as recited in claim 1, wherein loading the GPU driver into the hypervisor further comprises:
running the hypervisor from a most privileged central processing unit (CPU) mode; and
isolating the GPU driver from other software that runs in less privileged modes.

11. The method as recited in claim 1, wherein loading the user application into the enclave further comprises:
adding sensitive code and data of the user application and run-time as protected pages into the enclave using an instruction to add a page to an uninitialized enclave.

12. A computer system implementing a system architecture to support a trusted execution environment (TEE) with computational acceleration, comprising:
a processor device operatively coupled to a memory device, the processor device being configured to:
establish a first trusted channel between a user application stored on an enclave and a graphics processing unit (GPU) driver loaded on a hypervisor, wherein establishing the first trusted channel includes leveraging page permissions in an extended page table (EPT) to isolate the first trusted channel between the enclave and the GPU driver in a physical memory of an operating system (OS);
establish a second trusted channel between the GPU driver and a GPU device; and
launch a unified TEE that includes the enclave and the hypervisor with execution of application code of the user application.

13. The system as recited in claim 12, wherein during the execution of the application code, the unified TEE protects the confidentiality of the application code and data execution in the entire software stack and hardware spaces.

14. The system as recited in claim 12, the processor device is further configured to:
accelerate computation using the GPU device through the first trusted channel and the second trusted channel, wherein the first trusted channel and the second trusted channel are protected by the unified TEE.

15. The system as recited in claim 12, wherein, when establishing the second trusted channel, the processor device is further configured to:
leverage page permissions in the EPT to mark pages shared between the GPU driver and GPU device in the physical memory.

16. The system as recited in claim 15, wherein the GPU driver and a corresponding user run-time transfers at least one of sensitive code and sensitive data through shared memory to offload workloads to the GPU device.

17. The system as recited in claim 16, wherein the processor device is further configured to:
mark, by the hypervisor, pages that contain the at least one of sensitive code and sensitive data as only accessible by the GPU driver and the enclave in the EPT whenever transmission is implemented through the shared memory.

18. The system as recited in claim 16, wherein the processor device is further configured to:
in response to an attempt by untrusted software to access the shared memory, raise a trap to the hypervisor and detect the attempt as illegal access.

19. The system as recited in claim 12, wherein, when establishing the second trusted channel, the processor device is further configured to:
perform authentication of the GPU driver at every access to each hardware space through which the GPU device and GPU driver interact.

20. A computer program product for implementing a system architecture to support a trusted execution environment (TEE) with computational acceleration, the computer program product comprising a non-transitory computer readable storage medium having program instructions embodied therewith, the program instructions executable by a computing device to cause the computing device to perform the method comprising:
establishing a first trusted channel between a user application stored on an enclave and a graphics processing unit (GPU) driver loaded on a hypervisor, wherein establishing the first trusted channel includes leveraging page permissions in an extended page table (EPT) to isolate the first trusted channel between the enclave and the GPU driver in a physical memory of an operating system (OS);
establishing a second trusted channel between the GPU driver and a GPU device; and
launching a unified TEE that includes the enclave and the hypervisor with execution of application code of the user application.

* * * * *